(12) United States Patent
Schwindt

(10) Patent No.: US 12,668,274 B2
(45) Date of Patent: Jun. 30, 2026

(54) HANDLING UNCERTAINTY ASSOCIATED WITH A SENSOR MEASUREMENT USING A PREVIOUSLY DETERMINED COMBINED OCCUPANCY GRID

(71) Applicant: Robert Bosch GmbH, Stuttgart (DE)

(72) Inventor: Oliver Frank Schwindt, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 268 days.

(21) Appl. No.: 18/497,785

(22) Filed: Oct. 30, 2023

(65) Prior Publication Data

US 2025/0136143 A1 May 1, 2025

(51) Int. Cl.
*B60W 60/00* (2020.01)
*G01C 21/00* (2006.01)

(52) U.S. Cl.
CPC ....... *B60W 60/001* (2020.02); *G01C 21/3844* (2020.08); *G01C 21/3881* (2020.08); *B60W 2420/403* (2013.01); *B60W 2420/408* (2024.01); *B60W 2554/4041* (2020.02); *B60W 2556/20* (2020.02); *B60W 2556/35* (2020.02); *B60W 2556/40* (2020.02)

(58) Field of Classification Search
CPC ......... B60W 60/001; B60W 2420/403; B60W 2420/408; B60W 2554/4041; B60W 2556/20; B60W 2556/35; B60W 2556/40; B60W 2050/0025; G01C 21/3844; G01C 21/3881; G01C 21/3859

USPC .. 701/23, 301, 1, 26, 409, 461, 2, 400, 410, 701/446, 468, 120, 538, 56, 54, 523, 414, 701/420, 31.4, 445, 533, 28, 532, 300
See application file for complete search history.

(56) References Cited

U.S. PATENT DOCUMENTS

| | | | |
|---|---|---|---|
| 11,550,020 B2 | 1/2023 | Dia et al. | |
| 11,756,308 B2 | 9/2023 | Balazs | |
| 2021/0046954 A1* | 2/2021 | Haynes ........... | B60W 60/00272 |
| 2021/0131823 A1 | 5/2021 | Giorgio et al. | |
| 2021/0380099 A1* | 12/2021 | Lee ....................... | B60W 30/09 |
| 2022/0083077 A1 | 3/2022 | Pereira Da Silva et al. | |
| 2022/0126865 A1* | 4/2022 | Marcotte ........... | B60W 30/0956 |

(Continued)

*Primary Examiner* — Anne Marie Antonucci
*Assistant Examiner* — Jodi Jones
(74) *Attorney, Agent, or Firm* — Michael Best & Friedrich LLP

(57) ABSTRACT

System for handling uncertainty associated with a sensor measurement using a previously determined combined occupancy grid. The system includes a plurality of sensors and an electronic processor. The electronic processor is configured to determine a combined occupancy grid associated with a first time, receive a measurement associated with a second time, determine an uncertainty grid including an uncertainty distribution associated with the measurement, and convolute the combined occupancy grid associated with the first time with the uncertainty grid to determine one or more convolution values. Each convolution value is associated with a cell in the uncertainty grid. The electronic processor is configured to assign a first probability to a cell associated with a greatest convolution value, assign a second probability to a cell associated with a mean of the uncertainty distribution, and, using the first probability and the second probability, determine a combined occupancy grid associated with the second time.

20 Claims, 6 Drawing Sheets

100

VEHICLE
105

(56)     References Cited

U.S. PATENT DOCUMENTS

| 2022/0129726 A1* | 4/2022 | Marina | .................... G06N 3/04 |
| 2022/0163966 A1* | 5/2022 | Fonseca | ............... G05D 1/0214 |
| 2022/0319188 A1* | 10/2022 | Kogut | .................. G01S 17/931 |
| 2022/0414151 A1 | 12/2022 | Steyer et al. | |
| 2024/0190461 A1 | 6/2024 | Schwindt et al. | |

* cited by examiner

VEHICLE
105

ELECTRONIC
CONTROLLER
110

VEHICLE CONTROL
SYSTEMS
115

130

SENSORS
120

USER INTERFACE
125

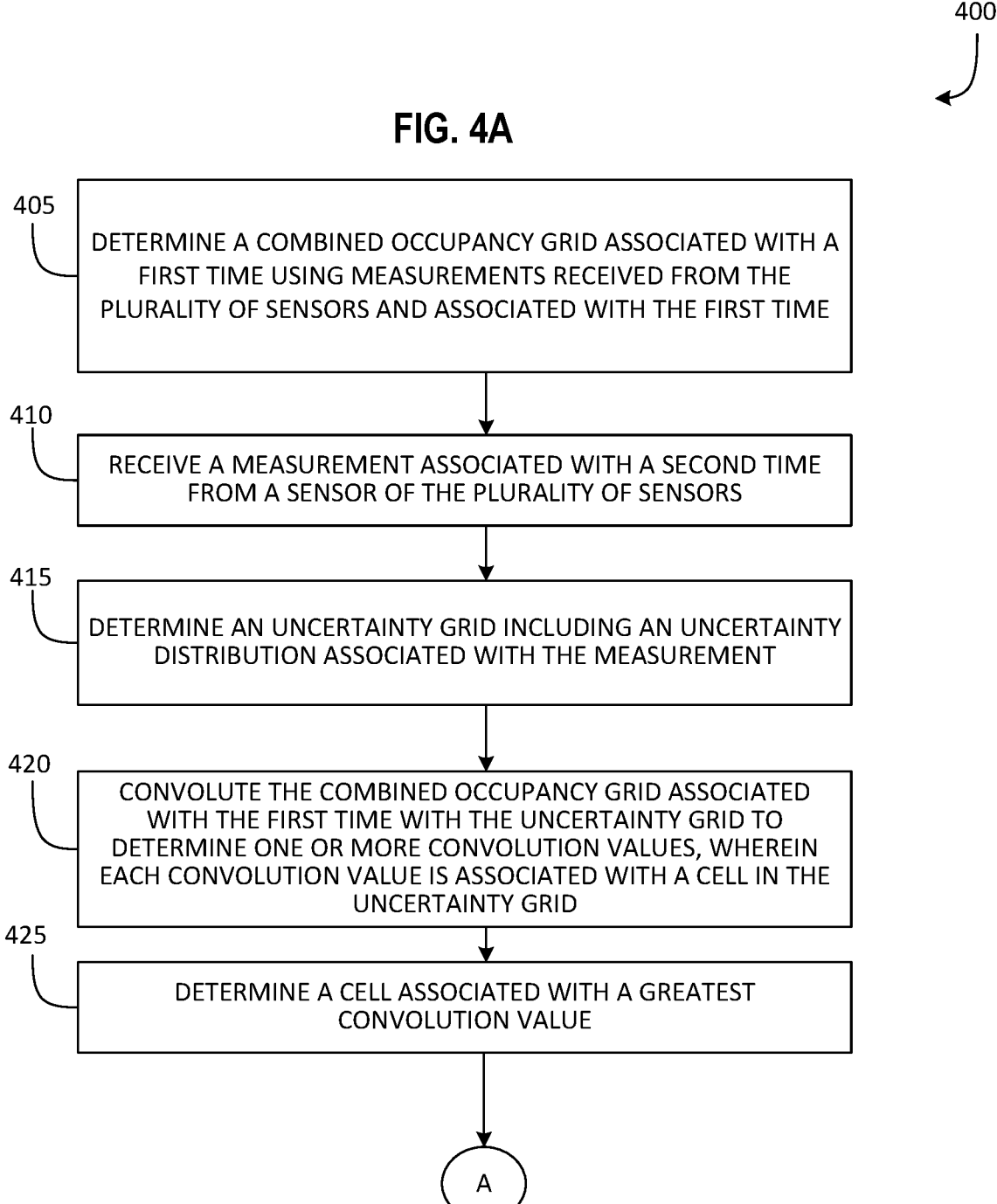

405 — DETERMINE A COMBINED OCCUPANCY GRID ASSOCIATED WITH A FIRST TIME USING MEASUREMENTS RECEIVED FROM THE PLURALITY OF SENSORS AND ASSOCIATED WITH THE FIRST TIME

410 — RECEIVE A MEASUREMENT ASSOCIATED WITH A SECOND TIME FROM A SENSOR OF THE PLURALITY OF SENSORS

415 — DETERMINE AN UNCERTAINTY GRID INCLUDING AN UNCERTAINTY DISTRIBUTION ASSOCIATED WITH THE MEASUREMENT

420 — CONVOLUTE THE COMBINED OCCUPANCY GRID ASSOCIATED WITH THE FIRST TIME WITH THE UNCERTAINTY GRID TO DETERMINE ONE OR MORE CONVOLUTION VALUES, WHEREIN EACH CONVOLUTION VALUE IS ASSOCIATED WITH A CELL IN THE UNCERTAINTY GRID

425 — DETERMINE A CELL ASSOCIATED WITH A GREATEST CONVOLUTION VALUE

A

HANDLING UNCERTAINTY ASSOCIATED WITH A SENSOR MEASUREMENT USING A PREVIOUSLY DETERMINED COMBINED OCCUPANCY GRID

SUMMARY

Grid maps include a set of cells associated with respective positions or locations in the environment surrounding a machine. The cells, which may be 2D cells or 3D voxels, include occupancy information relating to static or dynamic features of the environment. For example, a cell may be assigned an occupancy probability or occupancy value that represents the likelihood that a feature is at the location in the environment associated with the cell.

Static features are stationary features of the environment. Static features include, for example, guard rails, curbs, buildings, sidewalks, parked vehicles, construction site equipment, trash collection bins, and under-drivable structures (e.g., bridges, overhanging signs, overhanging wires). Dynamic features are non-stationary features of the environment. Dynamic features include, for example, pedestrians, moving vehicles, and animals.

In some instances, grid maps are single layer maps or multi-layer grid maps, wherein each layer comprises a set of cells storing information relating to a type of feature. For example, the multi-layer grid may include an occupancy layer, such as a static occupancy layer and/or a dynamic occupancy layer. In some instances, the multi-layer grid also includes a ground surface layer and a road marking layer. The ground surface layer may include information relating to ground semantics, such as ground elevation, ground surface type (e.g., grass, asphalt, gravel), or ground surface friction. The road marking layer may include information relating to road markings, detour signage, or traffic flow.

Autonomous or semi-autonomous machines such as vehicles or robots may rely on grid maps storing probabilistic information relating to features of an environment in order to control vehicle movement in the environment. The implementations described herein relate to the occupancy layer of a grid map (referred to herein as a combined occupancy grid). Various sensors of the machine output sensor information that is fused to create a combined occupancy grid.

The various sensors included in the machine may have uncertainties associated with their measurements regarding a location of an object in the environment of the machine (an external object). For example, stereo and mono cameras may have uncertainties associated with their distance estimations of external objects, and these uncertainties grow as the distance from the camera to the external object increases. For radar sensors, there can be a considerable uncertainty associated with the angular position of an external object relative to the radar sensor. The uncertainty associated with measurements made by a radar sensor may be Gaussian distributed, but also have systematic, non-linear effects (for example, angular ambiguities that are caused by the antenna design of the radar sensor).

The uncertainties associated with sensor measurements can lead to systematic errors. For example, consecutive measurements may have a consistent offset from the ground truth rather than a random distribution around a mean that is consistent with the ground truth, leading to the incorrect determination of a location associated with an external object.

In existing systems and methods for handling uncertainty, a Gaussian ellipse is created around a sensor measurement.

The center of the ellipse is a location of an external object as determined by a sensor and it is referred to as the mean of the uncertainty distribution. The axes of the ellipses are determined based on an uncertainty associated with a sensor. Therefore, the ellipse representing the uncertainty is larger when the uncertainty associated with a sensor is larger. Each cell of an uncertainty grid that is included in the Gaussian ellipse is assigned a distribution value and the distribution values are normalized. Cells closer to the center of the ellipse are associated with higher distribution values than cells further from the center of the ellipse. This results in a low distribution value being assigned to every cell included in large ellipses.

The distribution values included in the uncertainty grid are then used to update the occupancy values included in an occupancy grid. Therefore, occupancy build up when sensor measurements are very uncertain (where the ellipse is large and each cell included in the ellipse is assigned a low distribution value) is too slow to be useful. Existing systems for handling uncertainty may also lead to ghost occupancy because uncertainty distribution values associated with a location where there is no external object cause the occupancy value associated with the location to build up over time. Ghost occupancy occurs when the occupancy value associated with a location is increased over time until the occupancy value rises to a predetermined threshold, where an electronic processor determines an external object to be at the location even though there is no external object at the location. Ghost occupancy can lead to a vehicle or a robot with autonomous or semi-autonomous functionality performing incorrect or unnecessary movements. For example, a vehicle may brake suddenly when an occupancy grid indicates that there is an external object in front of the vehicle. This incorrect braking may result in a disruption to the flow of traffic, an increase in the amount of time a journey takes, driver irritation, a combination of the foregoing, or the like.

Therefore, the implementations described herein provide systems and methods for handling uncertainty associated with a sensor measurement using a previously determined combined occupancy grid. The systems and methods described herein reduce the likelihood of ghost occupancy due to sensor uncertainty and address the problem of slow occupancy build up associated with very uncertain sensor measurements.

One example implementation provides a system for handling uncertainty associated with a sensor measurement using a previously determined combined occupancy grid. The system includes a plurality of sensors and an electronic processor. The electronic processor is configured to determine a combined occupancy grid associated with a first time using measurements received from the plurality of sensors and associated with the first time, receive a measurement associated with a second time from a sensor of the plurality of sensors, and determine an uncertainty grid including an uncertainty distribution associated with the measurement. The electronic processor is also configured to convolute the combined occupancy grid associated with the first time with the uncertainty grid to determine one or more convolution values. Each convolution value is associated with a cell in the uncertainty grid. The electronic processor is further configured to determine a cell associated with a greatest convolution value, assign a first probability to the cell associated with the greatest convolution value, assign a second probability to a cell associated with a mean of the uncertainty distribution, and, using the first probability and the second probability, determine a combined occupancy grid associated with the second time. The electronic processor is also configured to control a machine based on the combined occupancy grid associated with the second time, wherein the machine is configured to move autonomously or semi-autonomously.

Another example implementation provides a method for handling uncertainty associated with a sensor measurement using a previously determined combined occupancy grid. The method includes determining a combined occupancy grid associated with a first time using measurements received from a plurality of sensors and associated with the first time, receiving a measurement associated with a second time from a sensor of the plurality of sensors, and determining an uncertainty grid including an uncertainty distribution associated with the measurement. The method also includes convoluting the combined occupancy grid associated with the first time with the uncertainty grid to determine one or more convolution values. Each convolution value is associated with a cell in the uncertainty grid. The method further includes determining a cell associated with a greatest convolution value, assigning a first probability to the cell associated with the greatest convolution value, assigning a second probability to a cell associated with a mean of the uncertainty distribution and, using the first probability and the second probability, determining a combined occupancy grid associated with the second time. The method further includes controlling a machine based on the combined occupancy grid associated with the second time, wherein the machine is configured to move autonomously or semi-autonomously.

BRIEF DESCRIPTION OF THE DRAWINGS

FIG. 1 schematically illustrates an example system for handling uncertainty associated with a sensor measurement using a previously determined combined occupancy grid.

FIG. 4A and FIG. 4B provide a flowchart of an example method for handling uncertainty associated with a sensor measurement using a previously determined combined occupancy grid.

DETAILED DESCRIPTION

Figure 2:
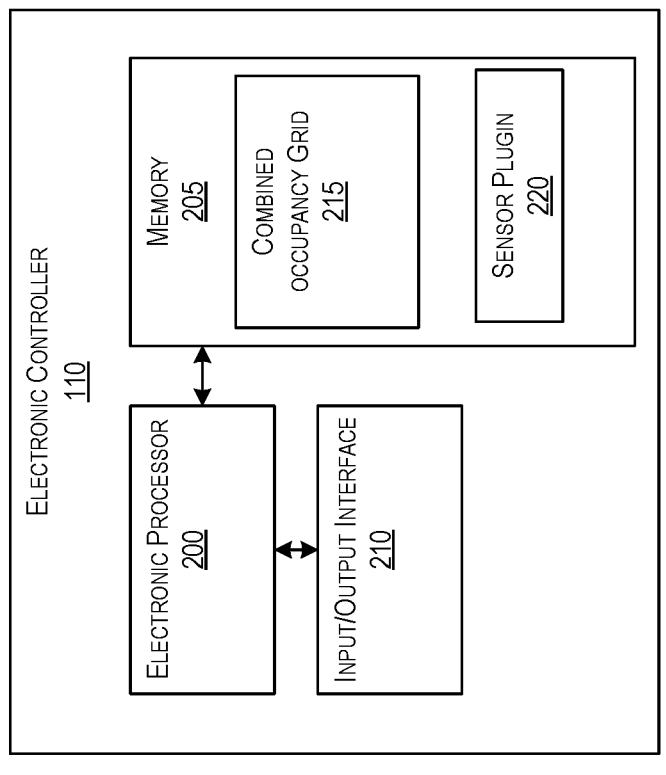
FIG. 2 schematically illustrates an example electronic controller included in the system of FIG. 1.

Before any aspects, features, or instances are explained in detail, it is to be understood that the aspects, features, or instances are not limited in their application to the details of construction and the arrangement of components set forth in the following description or illustrated in the following drawings. Other instances are possible and are capable of being practiced or of being carried out in various ways.

Also, it is to be understood that the phraseology and terminology used herein is for the purpose of description and should not be regarded as limiting. The terms "mounted," "connected" and "coupled" are used broadly and encompass both direct and indirect mounting, connecting, and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

It should also be noted that a plurality of hardware and software based devices, as well as a plurality of different structural components may be utilized in various implementations. Aspects, features, and instances may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one instance, the electronic based aspects of the invention may be implemented in software (for example, stored on non-transitory computer-readable medium) executable by one or more processors. As a consequence, it should be noted that a plurality of hardware and software based devices, as well as a plurality of different structural components may be utilized to implement the invention. For example, "control units" and "controllers" described in the specification can include one or more electronic processors, one or more memory modules including a non-transitory computer-readable medium, one or more input/output interfaces, and various connections (for example, a system bus) connecting the components. It should be understood that although certain drawings illustrate hardware and software located within particular devices, these depictions are for illustrative purposes only. In some instances, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

For ease of description, some or all of the example systems presented herein are illustrated with a single exemplar of each of its component parts. Some examples may not describe or illustrate all components of the systems. Other instances may include more or fewer of each of the illustrated components, may combine some components, or may include additional or alternative components.

Figure 1:
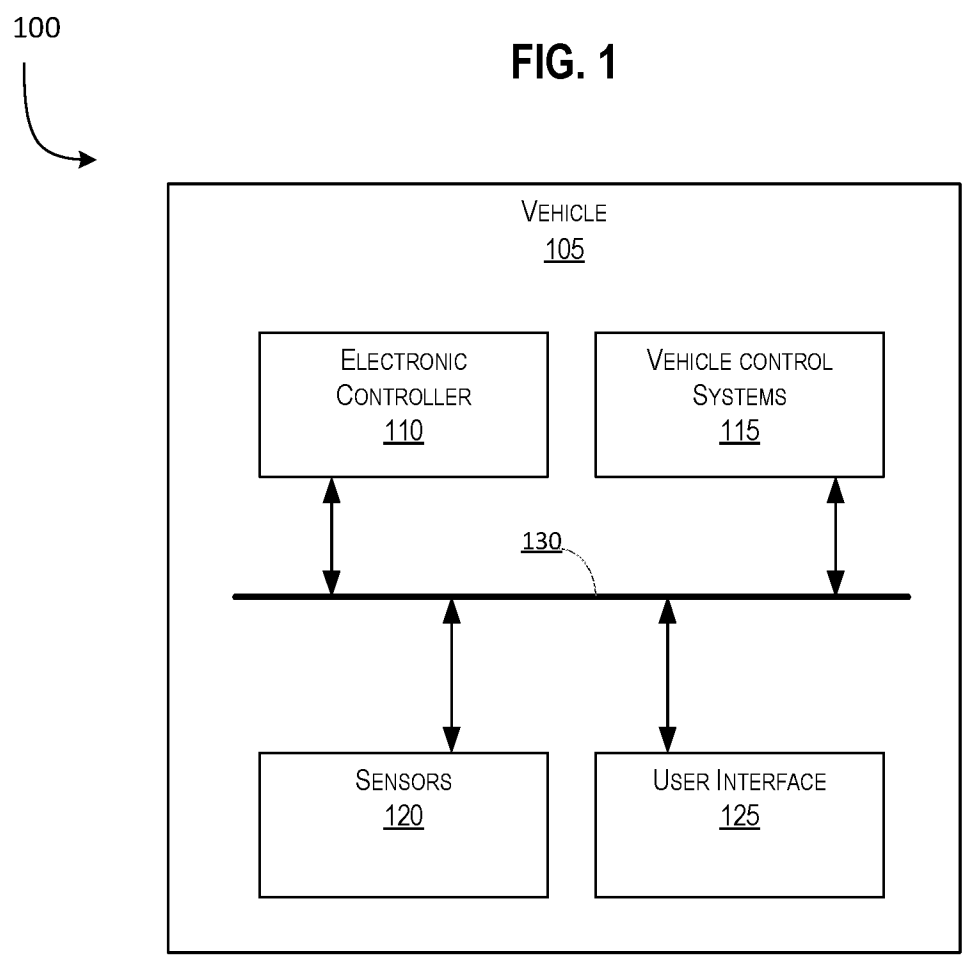

FIG. 1 schematically illustrates an example system 100 for handling uncertainty associated with a sensor measurement using a previously determined combined occupancy grid. In the illustrated example, the system 100 includes a machine such as a vehicle 105. While the machine included in the system 100 is illustrated and described herein as the vehicle 105 with autonomous or semi-autonomous functionality, the methods described herein may be applied to any machine or robot with autonomous of semi-autonomous functionality. The vehicle 105 includes an electronic controller 110, a plurality of vehicle control systems 115, a plurality of sensors 120, and a user interface 125. The components of the vehicle 105, along with other various modules and components are electrically and communicatively coupled to each other via direct connections or by or through one or more control or data buses (for example, the bus 130), which enable communication therebetween. In some instances, the bus 130 is a Controller Area Network (CAN™) bus. In some instances, the bus 130 is an automotive Ethernet™, a FlexRay™ communications bus, or another suitable bus. In alternative instances, some or all of the components of the vehicle 105 may be communicatively coupled using suitable wireless modalities (for example, Bluetooth™ or near field communication connections).

The electronic controller 110 (described in greater detail below with respect to FIG. 2) communicates with the vehicle control systems 115 and the sensors 120. The electronic controller 110 may receive sensor data from the sensors 120 and determine control commands for the vehicle 105. The electronic controller 110 transmits the control commands to, among other things, the vehicle control systems 115 to operate or assist in operating the vehicle 105 (for example, by generating braking signals, acceleration signals, steering signals, or the like). In some instances, the electronic controller 110 is part of one or more vehicle controllers that implement autonomous or semi-autonomous functions of the vehicle 105.

The vehicle control systems 115 may include controllers, actuators, and the like for controlling operation of the vehicle 105 (for example, acceleration, braking, shifting gears, and the like). The vehicle control systems 115 communicate with the electronic controller 110 via the bus 130.

The sensors 120 determine one or more attributes of the vehicle 105 and its surrounding environment and communicate information regarding those attributes to other components of the vehicle 105 using, for example, messages transmitted on the bus 130. The sensors 120 may include, for example, vehicle control sensors, such as, for example, sensors that detect accelerator pedal position and brake pedal position, wheel speed sensors, vehicle speed sensors, yaw, pitch, and roll sensors, force sensors, and vehicle proximity sensors (for example, imaging devices and ultrasonic sensors). In some instances, the sensors 120 include one or more cameras or other imaging devices configured to capture one or more images of the environment surrounding the vehicle 105. Radar and LiDAR sensors may also be used. The sensors 120 may each include an electronic processor configured to process raw sensor data before outputting sensor information to other components of the vehicle 105, such as the electronic controller 110.

In some instances, the electronic controller 110 controls aspects of the vehicle 105 based on commands received from the user interface 125. The user interface 125 provides an interface between the components of the vehicle 105 and an occupant (for example, a driver) of the vehicle 105. The user interface 125 is configured to receive input from the occupant, receive indications of vehicle status from the system's controllers (for example, the electronic controller 110), and provide information to the driver based on the received indications. The user interface 125 provides visual output, such as, for example, graphical indicators (for example, fixed or animated icons), lights, colors, text, images, combinations of the foregoing, and the like. The user interface 125 includes a suitable display mechanism for displaying the visual output, such as, for example, a liquid crystal display (LCD) touch screen, or an organic light-emitting diode (OLED) touch screen), or other suitable mechanisms. In some instances, the user interface 125 displays a graphical user interface (GUI) (for example, generated by the electronic controller 110 and presented on a display screen) that enables a driver or passenger to interact with the vehicle 105. The user interface 125 may also provide audio output to the driver via a chime, buzzer, speaker, or other suitable device included in the user interface 125 or separate from the user interface 125. In some instances, user interface 125 provides haptic outputs to the driver by vibrating one or more vehicle components (for example, the vehicle's steering wheel, a seat, or the like), for example, using a vibration motor. In some instances, the user interface 125 provides a combination of visual, audio, and haptic outputs.

FIG. 2 illustrates an example of the electronic controller 110, which includes an electronic processor 200 (for example, a microprocessor, application specific integrated circuit, etc.), a memory 205, and an input/output interface 210. The memory 205 may be made up of one or more non-transitory computer-readable media and includes at least a program storage area and a data storage area. The program storage area and the data storage area can include combinations of different types of memory, such as read-only memory ("ROM"), random access memory ("RAM"), electrically erasable programmable read-only memory ("EEPROM"), flash memory, or other suitable memory devices. The electronic processor 200 is coupled to the memory 205 and the input/output interface 210. The electronic processor 200 sends and receives information (for example, from the memory 205 and/or the input/output interface 210) and processes the information by executing one or more software instructions or modules, capable of being stored in the memory 205, or another non-transitory computer readable medium. The software can include firmware, one or more applications, program data, filters, rules, one or more program modules, and other executable instructions. The electronic processor 200 is configured to retrieve from the memory 205 and execute, among other things, software for performing methods as described herein. In the example illustrated, the memory 205 stores, among other things, a combined occupancy grid 215 for storing information regarding the locations of objects in an environment surrounding the vehicle 105. The memory also stores a one or more instances of a sensor plugin 220. The input/output interface 210 transmits and receives information from devices external to the electronic controller 110 (for example, components of the vehicle 105 via the bus 130).

Figure 3:
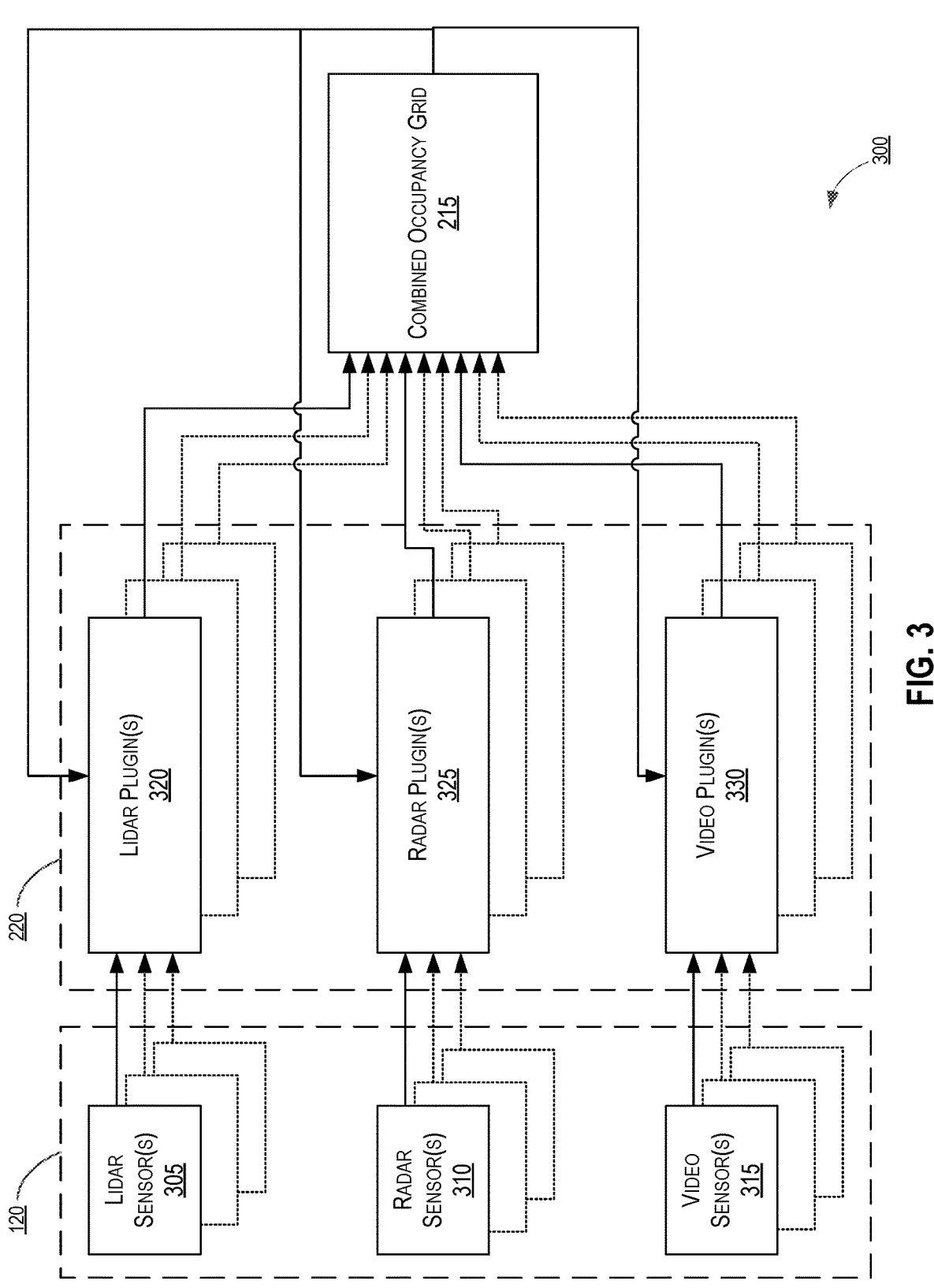
FIG. 3 illustrates an example sensor configuration for implementing the method of FIG. 4.

FIG. 3 schematically illustrates an example sensor configuration 300 for implementing the method of FIG. 4. The plurality of sensors 120 may include one or more lidar sensors 305 configured to output lidar data, one or more radar sensors 310 configured to output radar data, and one or more video sensors 315 or cameras configured to output video data or image data. The sensor configuration 300 also includes each instance of the one or more instances of the sensor plugin 220. For example, for each of the lidar sensors 305, the electronic processor 200 generates an instance of a lidar plugin 320. For each of the radar sensors 310, the electronic processor 200 generates an instance of a radar plugin 325. For each of the video sensors 315, the electronic processor 200 generates an instance of a video plugin 330. The sensor configuration 300 further includes the combined occupancy grid 215. In some instances, the combined occupancy grid 215 provides feedback to each instance of the sensor plugin 220, such that each instance of the sensor plugin 220 receives a repeatedly-updated combined occupancy grid 215 including sensor information previously integrated from each of the plurality of sensors 120.

In some instances, the plurality of sensors 120 include predetermined groups of sensors, and the sensor plugin 220 is instantiated once for each group of sensors. For example, the electronic processor 200 may instantiate a first sensor plugin for processing sensor information from a first group of sensors, and instantiate a second sensor plugin for processing sensor information from a second group of sensors. The first group of sensors may include, for example, sensors of different modalities that output sensor information corresponding to overlapping or neighboring positions in the environment. The second group of sensors may include, for example, sensors of the same modality that output sensor information corresponding to overlapping or neighboring positions in the environment. In some instances, the sensor information output by sensors of the same group of sensors include the same timestamps or timestamps of negligible differences.

Figure 4B:
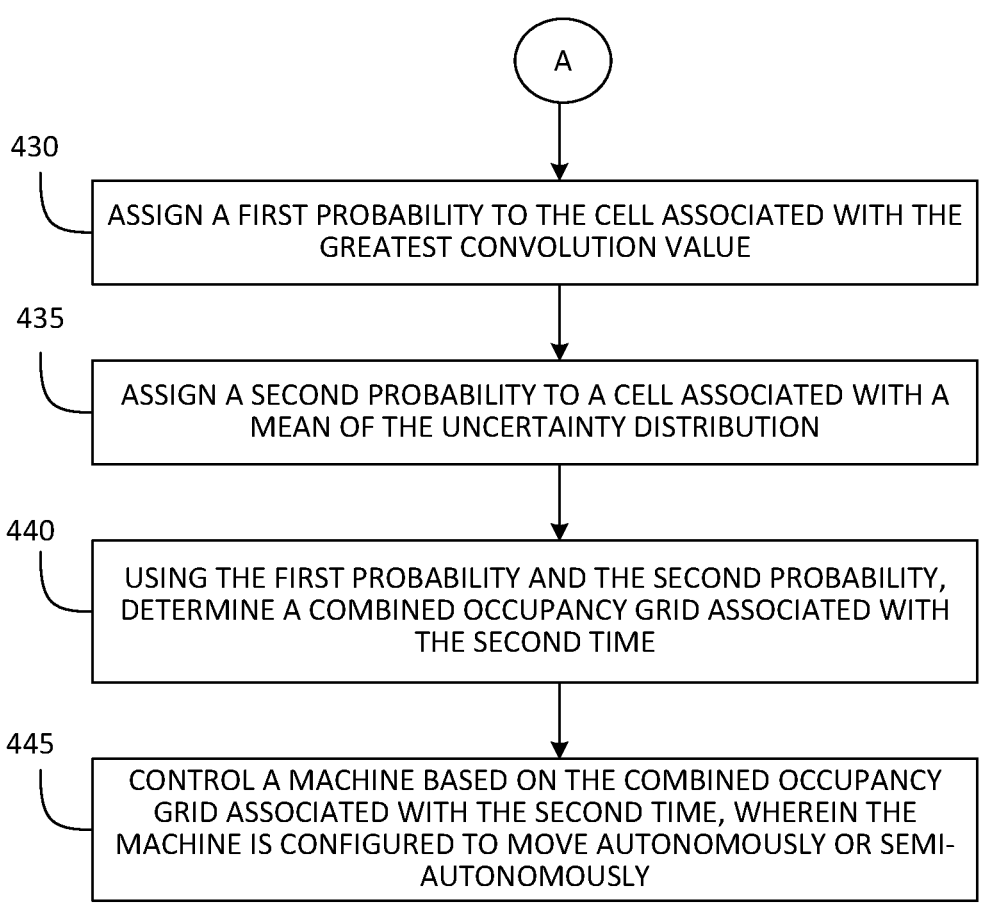

FIG. 4A and FIG. 4B provide a flowchart of an example method 400 for handling uncertainty associated with a sensor measurement using a previously determined combined occupancy grid. In some implementations the method 400 is performed when the electronic processor 200 executes an instance of the sensor plug-in 220. In some implementations, the method 400 begins at step 405, when the electronic processor 200 determines a combined occupancy grid associated with a particular moment (which is referred to as a first time, even though the moment may not be an initial time) using measurements received from the plurality of sensors and associated with the first time. In some implementations, the electronic processor 200 may store the combined occupancy grid associated with the first time in the memory 205 so that the electronic processor 200 may retrieve the combined occupancy grid associated with the first time from memory 205 at a later time. In some implementations, each cell of a plurality of cells included in the combined occupancy grid associated with the first time is assigned an occupancy value. An occupancy value is a value between 0 and 1. In one example implementation, an occupancy value for a cell is determined using the following equation:

$$occupancy\_value = mass\_occupied/max\_mass.$$

In this equation, the variable "mass_occupied" is a mass value assigned to a cell that represents whether there is an external object in a location associated with the cell. The mass value may be increased or decreased over time depending on whether a sensor measurement supports the presence of an external object in the location. In some implementations, a greater mass value represents a stronger likelihood or plausibility that there is an external object in a location associated with a cell. The variable "max_mass" is the maximum mass value that can be assigned to a cell to represent the presence of an external object in a location associated with the cell.

In another example implementation where Dempster-Schaefer Theory is used, an occupancy value for a cell is determined using the following equation:

$$occupancy\_value =$$
$$(mass\_occupied + (max\_mass - mass\_occupied - mass\_free) * 0.5)/$$
$$max\_mass$$

In this equation, the variable "mass_occupied" is a mass value assigned to a cell that represents whether there is an external object in a location associated with the cell. The value may be increased or decreased over time depending on whether a sensor measurement supports the presence of an external object in the location. The variable "mass_free" is a mass value assigned to a cell that represents whether a location associated with the cell is unoccupied (there is no external object at the location associated with the cell). The value may be increased or decreased over time depending on whether a sensor measurement supports the presence of an external object in the location. The variable "max_mass" is the maximum mass value that can be assigned to a cell to represent the presence of an external object in a location associated with the cell.

At step 410, the electronic processor 200 receives a measurement associated with another particular moment (referred to as a second time, although the moment does not need to be second in a sequence) from a sensor of the plurality of sensors 120. In some implementations, the first time is the time associated with what is the most recently created combined occupancy grid at the second time. For example, the first time is 1 second and the second time is 1.2 seconds and no combined occupancy grid has been determined by the electronic processor 200 that is associated with a time between 1 second and 1.2 seconds.

In some implementations, the measurement received from the sensor at the second time is a point, a voxel, a preprocessed column that resulted from a group of clustered points, or the like. In some implementations, the sensor that the measurement is received from may be associated with a predetermined uncertainty. For example, the sensor may be associated with a constant value representing the uncertainty of the sensor. In another example, the sensor may be associated with a function that represents the uncertainty of the sensor (for example, when the sensor is a camera, the function could determine an uncertainty based on the distance between the camera and the measured external object). In other implementations an uncertainty associated with the sensor may be adaptively determined by the electronic processor 200 while processing measurements from the sensor. For example, uncertainty associated with a measurement can be determined using stereo-camera disparity, point distribution from pre-processed clustering, or angular uncertainty and angular ambiguities from an antenna layout of a radar sensor.

At step 415, the electronic processor 200 determines an uncertainty grid including an uncertainty distribution associated with the measurement. In some implementations, each cell of the uncertainty grid that is included in the uncertainty distribution is assigned a distribution value. In some implementations, the uncertainty distribution has a mean which is a most likely location of an external object based on the measurement from the sensor. In some implementations, the uncertainty distribution is normalized such that the cell associated with the mean is assigned a distribution value of 1 and other cells included in the uncertainty distribution are assigned distribution values that are less than or equal to 1.

The uncertainty distribution may be created using the measurement received from the sensor and the uncertainty associated with the sensor. The center of the uncertainty distribution may be the mean of the uncertainty distribution. In one example, the uncertainty distribution may be a Gaussian ellipse (for example, in polar or Cartesian coordinates) and the axes of the ellipse may be determined based on the uncertainty associated with the sensor. Each cell of an uncertainty grid that is included in the Gaussian ellipse may be assigned a distribution value and the distribution values may be normalized. In a Gaussian distribution, cell associated with the mean is assigned a value of 1 and cells closer to the center of the ellipse are associated with higher distribution values than cells further from the center of the ellipse.

In another example, the uncertainty distribution may be a uniform distribution in one or more dimensions. A uniform distribution would imply that it is equally likely for every location included in the uncertainty range that the external object is positioned at the location. In other words, the same distribution value is assigned to each cell included in the uniform distribution. A uniform distribution may be used to model dimensions that are subject to systematic offsets (for example, a distance estimation from a sensor that is a camera). In yet another example, the distribution may be a non-linear distribution modelled on other factors considered or learned real-world data. For example, a non-linear distribution may include an uncertainty for each of the radar ambiguities that are possible in a given measurement from a radar sensor (for example, 5 uncertainty ellipses each associated with one of 5 ambiguous angle uncertainties associated with the radar sensor).

At step 420, the electronic processor 200 convolutes the combined occupancy grid associated with the first time with the uncertainty grid to determine one or more convolution values, wherein each convolution value is associated with or assigned to a cell in the uncertainty grid. In some implementations, the electronic processor 200 is configured to convolute the combined occupancy grid associated with the first time with the uncertainty grid to determine one or more convolution values by, for each cell of a plurality of cells included in the uncertainty grid and the uncertainty distribution, determining a distribution value assigned to the cell, determining an occupancy value assigned to a cell included in the combined occupancy grid associated with the first time that is also associated with the cell included in the uncertainty grid, and assigning the cell included in the uncertainty grid a convolution value based on the determined distribution value and the determined occupancy value. In some implementations, the convolution value is equal to the distribution value multiplied by the occupancy value and the convolution value is a value between 0 and 1.

The electronic processor 200 may only determine convolution values for a limited number of cells included in the uncertainty distribution because computing convolution values for a large number of cells takes time and processing power. For example, the electronic processor 200 may only determine convolution values for cells within a predetermined range from the mean of the uncertainty distribution. For example, the predetermined range may be a circle with a 5 cell radius or a 15 cell by 15 cell square and the center of the circle and the center of the square may be the mean of the uncertainty distribution.

Figure 5:
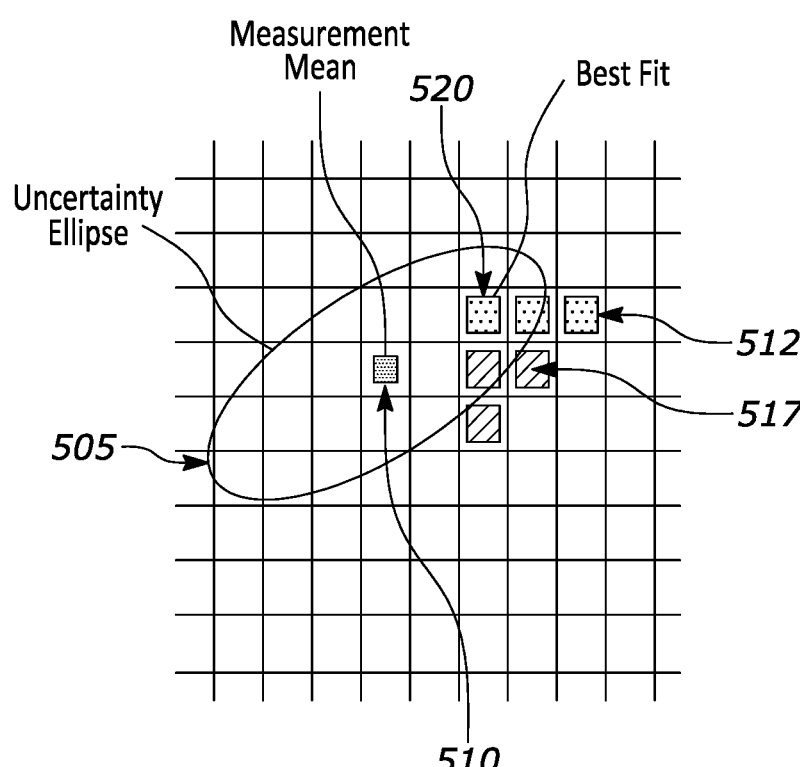
FIG. 5 is an example occupancy grid with a superimposed uncertainty distribution.

At step 425, the electronic processor 200 determines a cell associated with a greatest convolution value included in the uncertainty grid. FIG. 5 is an example of a combined occupancy grid associated with a first time 500 with a superimposed uncertainty distribution 505. The uncertainty distribution 505 is a Gaussian ellipse. The mean of the uncertainty distribution 510 is also illustrated. The cells that are filled in are cells in the combined occupancy grid associated with the first time 500 that are assigned an occupancy value. The stippled cells 512 are assigned higher occupancy values than the hatched cells 517. In the example illustrated in FIG. 5, the cell that is associated with the best fit or the greatest convolution value is the cell 520.

At step 430, the electronic processor 200 assigns a first probability to the cell associated with the greatest convolution value. When there are multiple cells that are associated with the greatest convolution value (in other words, when there is a tie), the electronic processor 200 may assign the first probability to each cell associated with the greatest convolution value. In some implementations, the electronic processor 200 may use one or more predefined rules to break ties between cells. For example, the electronic processor 200 may assign the first probability to the cell with the greatest convolution value that is also closest to the mean. In some implementations, the first probability is the greatest convolution value associated with a cell included in the uncertainty grid.

At step 435, the electronic processor 200 assigns a second probability to a cell associated with a mean of the uncertainty distribution. In some implementations, the second probability is 1 minus the greatest convolution value.

At step 440, the electronic processor 200, using the first probability and the second probability, determines a combined occupancy grid associated with the second time. In some implementations, in order to determine the combined occupancy grid associated with the second time the electronic processor 200 multiplies the first probability and the second probability by a weight. In some implementations, the weight is a value representing a likelihood that the external object associated with the measurement exists. The weight may be a constant value or variable value (for example, a value dependent on a radial distance from the sensor to the external object, internal values such as a signal-to-noise ratio, or the like).

To determine the combined occupancy grid associated with the second time, the electronic processor 200, for each cell included in the combined occupancy grid associated with the second time, assigns a mass value of a cell included in combined occupancy grid associated with the first time to the cell of the combined occupancy grid associated with the second time when the cell of the combined occupancy grid associated with the second time is associated with the cell included in the combined occupancy grid associated with the first time. When the cell of the combined occupancy grid associated with the second time is a new cell (for example, a cell associated with a location that was not observed by one of the sensors 120 at the first time), the electronic processor 200 assigns a mass value of 0 to the cell of the combined occupancy grid associated with the second time.

The electronic processor 200 may then update the mass values assigned to cells included in the combined occupancy grid associated with the second time using the weighted first probability and the weighted second probability. For example, the electronic processor 200 may update the mass values included in the combined occupancy grid associated with the second time by adding the weighted first probability to a mass value assigned to a cell included in the combined occupancy grid associated with the second time that is associated with the first probability and adding the weighted second probability to a mass value assigned to a cell included in the combined occupancy grid associated with the second time that is associated with the second probability. In another example, the electronic processor 200 updates the mass values assigned to the cells included in the combined occupancy grid associated with the second time using the weighted first probability and the weighted second probability in accordance with Dempster-Schafer theory. In some implementations, the electronic processor 200 does not increase the mass value assigned to a cell when the mass value assigned to the cell is equal to a predefined threshold.

In some situations, a location of an external object may be measured at a first time by a first sensor that is better able to measure the location of the external object than a second sensor that measures the location of the external object at a second time. In such situations, the method 400 allows the combined occupancy grid associated with the second time to benefit from the more accurate measurement made by the first sensor at the first time. By using the method 400, when the greatest convolution value is high, the mass value of the cell associated with the mean is increased very little, and the chances of ghost occupancy are reduced. When, over time, the greatest convolution value is generally a low value, the mass value of the cell associated with the mean will increase, ensuring that a measurement from a sensor is considered even when there are no measurements available from other sensors that are better able to measure the location of the external object.

In some implementations, in addition to determining the cell included in the uncertainty grid that is associated with the greatest convolution value, the electronic processor 200 determines, for each cell in the uncertainty grid assigned a convolution value, whether the convolution value is above a predetermined threshold. When the convolution value is above the predetermined threshold, the electronic processor 200 may endorse the cell assigned the convolution value. In some implementations, the electronic processor 200 uses cell endorsements as well as the first probability and the second probability to determine the combined occupancy grid associated with the second time. For example, the electronic processor 200 may not decrease a mass value assigned to a cell included in the combined occupancy grid associated with the second time that is associated with a cell included in the uncertainty grid that is endorsed. By not decreasing the mass value, the electronic processor 200 does not decrease the plausibility that there is an external object in the location associated with the endorsed cell. In some implementations, the electronic processor 200 may endorse any cell in the uncertainty grid that is assigned a distribution value.

At step 445, the electronic processor 200 controls a machine that is configured to move autonomously or semi-autonomously (for example, the vehicle 105), based on the combined occupancy grid associated with the second time. In some implementations, the electronic processor 200 may control the vehicle 105 using one or more of the vehicle control systems 115.

Thus, examples, aspects, and features herein provide, among other things, systems and methods for handling uncertainty associated with a sensor measurement using a previously determined combined occupancy grid.

What is claimed is:

1. A system for handling uncertainty associated with a sensor measurement using a previously determined combined occupancy grid, the system comprising:
a plurality of sensors; and
an electronic processor, the electronic processor configured to,
determine a combined occupancy grid associated with a first time using measurements received from the plurality of sensors and associated with the first time;
receive a measurement associated with a second time from a sensor of the plurality of sensors;
determine an uncertainty grid associated with the second time including an uncertainty distribution associated with the measurement associated with the second time;
convolute the combined occupancy grid associated with the first time with the uncertainty grid associated with the second time to determine one or more convolution values, wherein each convolution value is associated with a cell in the uncertainty grid;
determine a cell associated with a greatest convolution value;
assign a first probability to the cell associated with the greatest convolution value;
assign a second probability to a cell associated with a mean of the uncertainty distribution;

using the first probability and the second probability, determine a combined occupancy grid associated with the second time; and
control a machine based on the combined occupancy grid associated with the second time, wherein the machine is configured to move autonomously or semi-autonomously.

2. The system according to claim 1, wherein the uncertainty distribution is a non-linear distribution or a uniform distribution.

3. The system according to claim 2, wherein the non-linear distribution is a Gaussian ellipse.

4. The system according to claim 1, wherein the measurement is of a location of an external object within an environment of the machine and the mean of the uncertainty distribution is a most likely location of the external object based on the measurement from the sensor.

5. The system according to claim 1, wherein the first probability is the greatest convolution value and the second probability is 1 minus the greatest convolution value.

6. The system according to claim 1, wherein the machine is a vehicle and the electronic processor is configured to control the vehicle using one or more vehicle control systems.

7. The system according to claim 1, wherein each cell of the uncertainty grid that is included in the uncertainty distribution is assigned a distribution value and each cell that is included in the combined occupancy grid associated with the first time is assigned an occupancy value.

8. The system according to claim 1, wherein the electronic processor is configured to convolute the combined occupancy grid associated with the first time with the uncertainty grid to determine one or more convolution values, wherein each convolution value is associated with a cell in the uncertainty grid by
for each cell of a plurality of cells included in the uncertainty grid and the uncertainty distribution,
determining a distribution value assigned to the cell;
determining an occupancy value assigned to a cell included in the combined occupancy grid associated with the first time that is associated with the cell included in the uncertainty grid; and
assigning the cell included in the uncertainty grid a convolution value, wherein the convolution value is equal to the distribution value multiplied by the occupancy value.

9. The system according to claim 1, wherein the electronic processor is configured to convolute the combined occupancy grid associated with the first time with the uncertainty grid to determine one or more convolution values, wherein each convolution value is associated with a cell in the uncertainty grid by
for each cell included in the uncertainty grid and within a predetermined range from the mean of the uncertainty distribution,
determining a distribution value assigned to the cell;
determining an occupancy value assigned to a cell included in the combined occupancy grid associated with the first time that is associated with the cell included in the uncertainty grid; and
assigning the cell included in the uncertainty grid a convolution value, wherein the convolution value is equal to the distribution value multiplied by the occupancy value.

10. The system according to claim 1, wherein the electronic processor is configured to, using the first probability and the second probability, determine a combined occupancy grid associated with the second time by multiplying the first probability and the second probability by a weight;

for each cell included in the combined occupancy grid associated with the second time, when the cell of the combined occupancy grid associated with the second time is associated with a cell included in the combined occupancy grid associated with the first time, assign a mass value of the cell included in combined occupancy grid associated with the first time to the cell of the combined occupancy grid associated with the second time; and when the cell of the combined occupancy grid associated with the second time is a new cell, assign a mass value of 0 to the cell of the combined occupancy grid associated with the second time; and updating the mass values assigned to cells included in the combined occupancy grid associated with the second time using the weighted first probability and the weighted second probability.

11. The system according to claim 10, wherein the weight is a value representing a likelihood an external object associated with the measurement exists.

12. The system of claim 1, wherein the electronic processor is further configured to for each cell in the uncertainty grid associated with a convolution value, determine whether the convolution value is above a predetermined threshold; and when the convolution value is above the predetermined threshold, endorse the cell; and using the first probability and the second probability and the endorsements, determine a combined occupancy grid associated with the second time.

13. The system of claim 1, wherein the sensor is a radar sensor, a LiDAR sensor, or a camera.

14. A method for handling uncertainty associated with a sensor measurement using a previously determined combined occupancy grid, the method comprising:

determining a combined occupancy grid associated with a first time using measurements received from a plurality of sensors and associated with the first time;

receiving a measurement associated with a second time from a sensor of the plurality of sensors;

determining an uncertainty grid associated with the second time including an uncertainty distribution associated with the measurement associated with the second time;

convoluting the combined occupancy grid associated with the first time with the uncertainty grid associated with the second time to determine one or more convolution values, wherein each convolution value is associated with a cell in the uncertainty grid;

determining a cell associated with a greatest convolution value;

assigning a first probability to the cell associated with the greatest convolution value;

assigning a second probability to a cell associated with a mean of the uncertainty distribution;

using the first probability and the second probability, determining a combined occupancy grid associated with the second time; and controlling a machine based on the combined occupancy grid associated with the second time, wherein the machine is configured to move autonomously or semi-autonomously.

15. The method according to claim 14, wherein the uncertainty distribution is a non-linear distribution or a uniform distribution.

16. The method according to claim 15, wherein the non-linear distribution is a Gaussian ellipse.

17. The method according to claim 14, wherein the machine is a vehicle and controlling a machine based on the combined occupancy grid associated with the second time includes controlling the vehicle using one or more vehicle control systems.

18. The method according to claim 14, wherein convoluting the combined occupancy grid associated with the first time with the uncertainty grid to determine one or more convolution values, wherein each convolution value is associated with a cell in the uncertainty grid includes for each cell of a plurality of cells included in the uncertainty grid and the uncertainty distribution, determining a distribution value assigned to the cell;

determining an occupancy value assigned to a cell included in the combined occupancy grid associated with the first time that is associated with the cell included in the uncertainty grid; and assigning the cell included in the uncertainty grid a convolution value, wherein the convolution value is equal to the distribution value multiplied by the occupancy value.

19. The method according to claim 14, wherein convoluting the combined occupancy grid associated with the first time with the uncertainty grid to determine one or more convolution values, wherein each convolution value is associated with a cell in the uncertainty grid includes for each cell included in the uncertainty grid and within a predetermined range from the mean of the uncertainty distribution, determining a distribution value assigned to the cell;

determining an occupancy value assigned to a cell included in the combined occupancy grid associated with the first time that is associated with the cell included in the uncertainty grid; and assigning the cell included in the uncertainty grid a convolution value, wherein the convolution value is equal to the distribution value multiplied by the occupancy value.

20. The method of claim 14, the method further comprising for each cell in the uncertainty grid associated with a convolution value, determining whether the convolution value is above a predetermined threshold; and when the convolution value is above the predetermined threshold, endorsing the cell; and using the first probability and the second probability and the endorsements, determining a combined occupancy grid associated with the second time.

* * * * *